Patented May 9, 1933

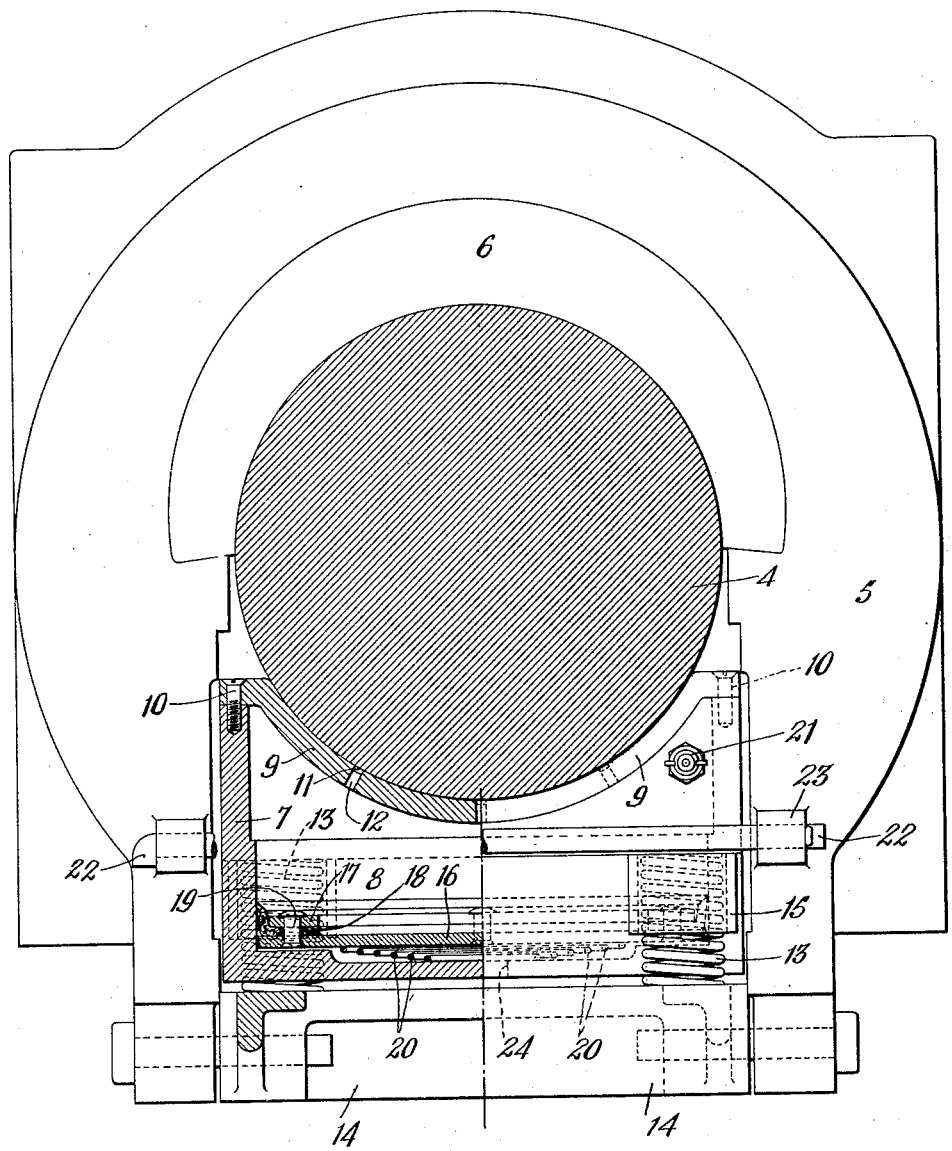

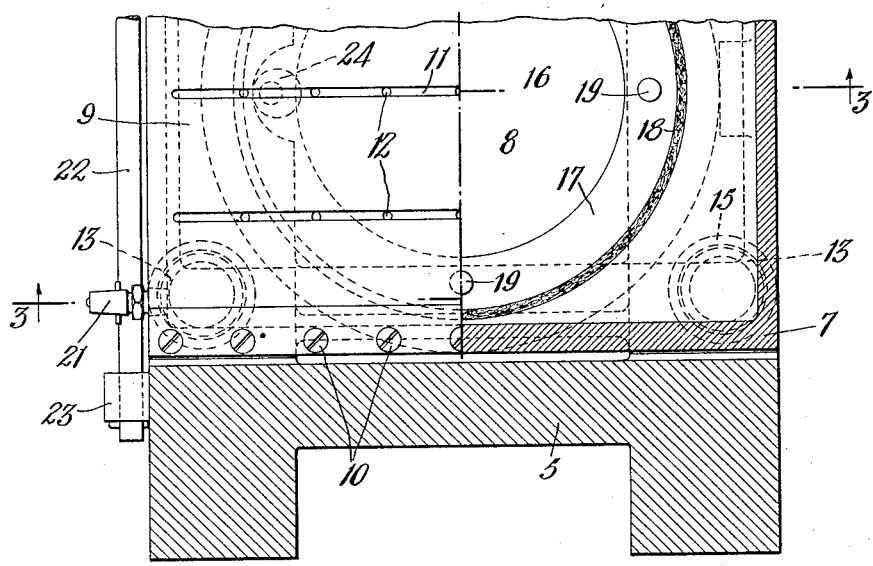
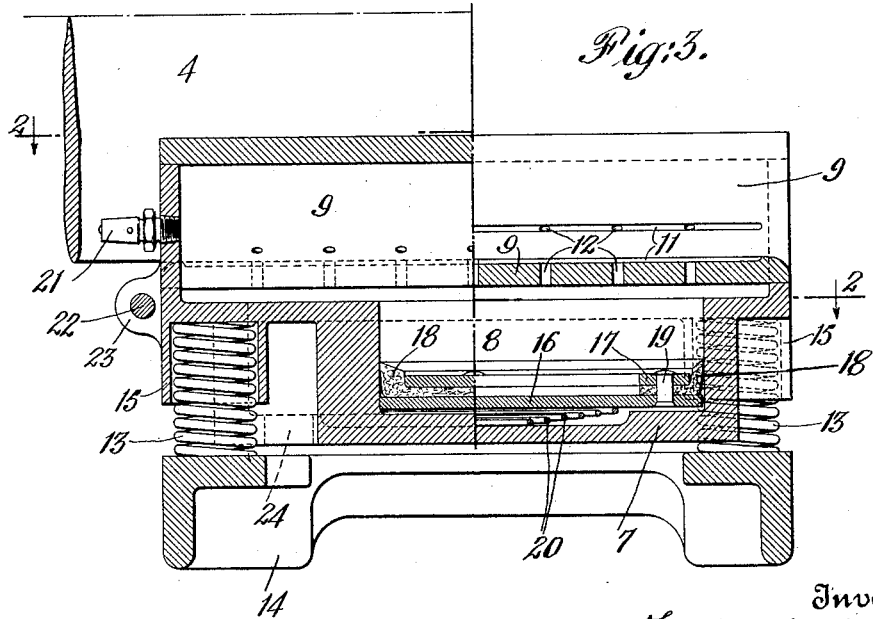

1,907,847

UNITED STATES PATENT OFFICE

FREDERICK W. MARTIN, OF BRONXVILLE, NEW YORK, ASSIGNOR TO FRANKLIN RAILWAY SUPPLY COMPANY, OF NEW YORK, N. Y., A CORPORATION OF DELAWARE

JOURNAL LUBRICATOR

Application filed May 14, 1927. Serial No. 191,291.

This invention relates to lubricators for railway vehicle axle boxes and is particularly applicable to locomotive driving boxes.

The primary object of the invention is the provision of a lubricator which is adapted to use a relatively soft grease and which, therefore, may be refilled by the use of a grease gun. As an incident to this the labor required for such refilling is greatly reduced.

How the foregoing together with other objects and advantages are obtained will be clear from the following description considered together with the accompanying drawings which illustrate the invention in its preferred form.

Of the drawings, Fig. 1 is an end view, partly in elevation and partly in section, illustrating my improved lubricator applied to a locomotive driving box of a well known construction.

Fig. 2 is a top view of the lubricator taken partly in elevation and partly in section as indicated by the line 2—2 of Fig. 3.

Fig. 3 is a side view of the lubricator taken on the line 3—3 of Fig. 2.

In the drawings, the reference numeral 4 indicates the driving axle journal which is surrounded by the box 5. A bearing 6 is provided between the box 5 and the axle 4.

The lubricator comprises a cellar or lubricant reservoir 7 which is provided with a cylindrical follower cavity 8 disposed substantially in the centre of the cellar member. The space in the cellar above the cavity 8 is substantially rectangular in horizontal cross section and is provided with a top enclosure which may take the form of a cover 9 which is tightly secured in place by the screws 10. This cover or plate 9 is formed to fit the curvature of the journal 4 and is preferably made of some bearing metal such, for example, as brass. A number of longitudinal lubricant distributing grooves 11 are provided on the journal face of the plate 9 and each groove 11 is provided with a plurality of spaced holes 12 communicating with the interior of the cellar.

A spring 13 at each corner of the lubricator bears on the box spreader 14 and is seated in a downwardly open cup 15 on the cellar member 7. These springs 13 preferably are designed to urge the plate 9 against the journal with a substantial pressure, say two or three pounds per square inch. A substantial pressure on the journal makes for a tight joint and thus reduces leakage and loss of the relatively soft grease.

The follower is of the plunger or pump type and comprises a circular plate 16 and a ring 17 between which is clamped a fibrous packing ring 18. The edge of this packing ring 18 is turned upwardly when the follower is inserted in the cavity 8 and fits tightly against the cylindrical wall of the cavity. The members of the follower may be secured together by rivets 19. A spring 20 urges the follower upwardly thus feeding the grease to the journal thru the openings 12 and the grooves 11.

At this point it should be observed that the type of feed of the lubricant produced by applicant's novel arrangement of relatively strong spring means for urging the cellar toward the journal and relatively weak spring means for urging the follower upwardly in the cellar, prevents the escape or discharge of the lubricant from the grooves 11 and the openings 12 in the curved plate 9 except by the wiping action of the journal when rotating. In other words, the grooves 11 and the openings 12 are sealed against the journal in such manner that no lubricant may flow therefrom when there is no relative movement between the journal and the top plate 9. The only lubricant, therefore, which is discharged through the openings and the grooves is that which is wiped or carried away by the bearing surface of the journal when the latter is rotating or moving relatively to the curved plate 9.

The lubricant, preferably a soft grease, is forced into the cellar thru the connection 21 which is adapted to be engaged by the delivery nozzle of any suitable pressure grease gun (not shown). The connection 21 is provided with a one way valve of a well known character which opens only when grease is being forced into the cellar. It is to be understood, of course, that when the cellar is being refilled the grease forces the follower downwardly. An opening 24 is provided in the bottom of the cellar below the follower in order that air may enter into or be exhausted from the cellar when the follower moves.

A pin 22, secured in lugs 23 on the box 5, retains the lubricator in position.

According to the foregoing I provide a lubricator which is adapted to use a relatively light or soft grease and which, as an incident to this, eliminates all the labor and trouble of removing lubricator end plates and parts ordinarily encountered when refilling a lubricator adapted to use a solid cake of grease.

Furthermore, it is to be noted that the cellar forms a substantially complete enclosure for the lubricant, and loss of lubricant is reduced to a minimum as the distributing grooves 11 are practically sealed by the journal.

I claim:—

1. A journal lubricator including a cellar member having an upper relatively large portion with a top having an opening therethrough and curved to fit the journal and a relatively small lower cylindrical portion depending from and in communication with the upper portion, means for urging the cellar toward the journal with pressure sufficient to seal said opening thereagainst, a circular follower fitting said lower portion and means for urging the follower upwardly to feed lubricant through said opening to the surface of the journal.

2. A journal lubricator including a cellar member having an upper relatively large squared portion with a top having an opening therethrough and curved to fit the journal, means for urging said cellar toward the journal with force sufficient to seal said opening thereagainst including spring means positioned under the corners of the said upper portion, said cellar also being provided with a relatively small cylindrical portion depending from the upper portion between said spring means, a circular follower fitting said lower portion and means for urging the follower upwardly to feed lubricant through said opening to the surface of the journal.

3. A journal lubricator of the character described including a cellar member having lubricant discharging passages therein adjacent the journal, means for urging the cellar toward the journal with force sufficient to seal the said passages thereagainst, means in the cellar for feeding lubricant through the passages to the surface of the journal, said cellar and the last mentioned means cooperating to provide a complete enclosure for the lubricant with the exception of said passages, and a cellar refilling means including a connection for admitting lubricant under pressure.

4. A journal lubricator including a cellar member having its top curved to fit the journal, said top having openings therein and relatively large smooth areas at the sides of the openings contacting with the journal, means for urging the cellar toward the journal with force sufficient to seal said openings thereagainst, and means in the cellar for feeding the lubricant through the openings to the surface of the journal, said last mentioned means and said cellar cooperating to provide a complete enclosure for the lubricant with the exception of said passages.

5. A journal lubricator including a cellar member with its top curved to fit the journal, said top having openings therethrough and grooves in its upper surface extended lengthwise of the journal and communicating with the openings, means for urging the cellar toward the journal with force sufficient to seal said grooves thereagainst, and means in the cellar for feeding the lubricant through the openings into said grooves to contact with the journal bearing surface, said last mentioned means and said cellar cooperating to provide a complete enclosure for the lubricant with the exception of said openings.

6. A journal lubricator of the character described including a cellar member having openings adjacent to the journal, means for urging the cellar toward the journal and means in the cellar for feeding lubricant through the openings to the surface of the journal, said first mentioned means being of strength sufficiently greater than the strength of said second mentioned means to seal said openings against the journal, and said feeding means and said cellar cooperating to provide a complete enclosure for the lubricant with the exception of said openings.

7. A journal lubricator including a cellar member with its top curved to fit the journal, said top having openings therethrough and relatively large smooth areas at the sides of the openings contacting with the journal; means in the cellar for feeding lubricant through the openings to the surface of the journal; and means, of greater strength than the first mentioned means, for urging the cellar toward the journal to seal the said openings thereagainst, said feeding means and said cellar cooperating to provide a complete enclosure for the lubricant with the exception of said openings.

8. A journal lubricator of the character described including a cellar member having openings adjacent to the journal, spring means for urging the cellar toward the journal and spring means in the cellar for feeding lubricant through said openings to the journal surface, said first mentioned spring means being of greater strength than the other spring means, and said feeding means and said cellar cooperating to provide a complete enclosure for the lubricant with the exception of said openings.

In testimony whereof I have hereunto signed my name.

FREDERICK W. MARTIN.